(12) United States Patent
Yamaki et al.

(10) Patent No.: US 11,066,751 B2
(45) Date of Patent: *Jul. 20, 2021

(54) ION EXCHANGE MEMBRANE FOR ALKALI CHLORIDE ELECTROLYSIS, METHOD FOR ITS PRODUCTION AND ALKALI CHLORIDE ELECTROLYSIS APPARATUS

(71) Applicant: AGC Inc., Chiyoda-ku (JP)

(72) Inventors: Yasushi Yamaki, Chiyoda-ku (JP); Takayuki Kaneko, Chiyoda-ku (JP); Hiromitsu Kusano, Chiyoda-ku (JP); Takuo Nishio, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 302 days.

This patent is subject to a terminal disclaimer.

(21) Appl. No.: 16/156,360

(22) Filed: Oct. 10, 2018

(65) Prior Publication Data

US 2019/0040538 A1 Feb. 7, 2019

Related U.S. Application Data

(63) Continuation of application No. PCT/JP2017/015157, filed on Apr. 13, 2017.

(30) Foreign Application Priority Data

Apr. 13, 2016 (JP) .............................. JP2016-080157

(51) Int. Cl.
  *C25B 13/08* (2006.01)
  *B01J 39/20* (2006.01)
  (Continued)

(52) U.S. Cl.
  CPC .............. *C25B 13/08* (2013.01); *B01J 39/05* (2017.01); *B01J 39/07* (2017.01); *B01J 39/20* (2013.01);
  (Continued)

(58) Field of Classification Search
  CPC ... C25B 13/08; C25B 9/10; C25B 1/46; B01J 39/07; B01J 39/20; B01J 47/12; B01J 39/05
  See application file for complete search history.

(56) References Cited

U.S. PATENT DOCUMENTS 10,669,641 B2 * 6/2020 Yamaki .................. C25B 13/08
2014/0073709 A1 * 3/2014 Hattori ..................... B01J 47/06
  521/27

FOREIGN PATENT DOCUMENTS

CN 101589179 A 11/2009
CN 103014758 4/2013
(Continued)

OTHER PUBLICATIONS

International Search Report dated Jun. 13, 2017 in PCT/JP2017/015157, filed on Apr. 13, 2017 (with English Translation).

*Primary Examiner* — Arun S Phasge
(74) *Attorney, Agent, or Firm* — Oblon, McClelland, Maier & Neustadt, L.L.P.

(57) ABSTRACT

To provide an ion exchange membrane for alkali chloride electrolysis which is a membrane having a high water permeability and being capable of maintaining a low electrolysis voltage while suppressing the amount of water supplied to a cathode chamber to be minimum, and which is capable of forming an aqueous alkali hydroxide solution having a high caustic alkali quality. The ion exchange membrane for alkali chloride electrolysis comprises a layer 12 made of a fluorinated polymer having carboxylic acid functional groups, and a layer 14A and a layer 14B made of a fluorinated polymer having sulfonic acid functional groups, wherein a reinforcing material 20 containing reinforcing threads 22 is disposed between the layer 14A and the layer 14B, the thickness when dried, of the layer 12 is from 9 to 28 μm, the layer 14B includes a layer having an ion (Continued)

exchange capacity of from 1.3 to 2.5 meq/g, the thickness when dried, of the layer 14B is from 6 to 100 μm, the layer 14A includes a layer having an ion exchange capacity of from 0.9 to 1.25 meq/g, and the thickness when dried, of the layer 14A is from 40 to 110 μm.

15 Claims, 2 Drawing Sheets

(51) Int. Cl.
*B01J 47/12* (2017.01)
*C25B 1/46* (2006.01)
*B01J 39/05* (2017.01)
*B01J 39/07* (2017.01)
*C25B 9/23* (2021.01)

(52) U.S. Cl.
CPC ............... *B01J 47/12* (2013.01); *C25B 1/46* (2013.01); *C25B 9/23* (2021.01)

(56) References Cited

FOREIGN PATENT DOCUMENTS

| | | |
|---|---|---|
| CN | 104114749 A | 10/2014 |
| EP | 3 216 896 A1 | 9/2017 |
| EP | 3 219 830 A1 | 9/2017 |
| EP | 3 284 848 A1 | 2/2018 |
| JP | 52-124496 | 10/1977 |
| JP | 54-11098 | 1/1979 |
| JP | 1-263288 | 10/1989 |
| JP | 5-98486 A | 4/1993 |
| JP | 6-33281 | 2/1994 |
| JP | 4168932 | 10/2008 |
| JP | 2013-163858 | 8/2013 |
| JP | 2014-58707 | 4/2014 |
| WO | WO 2016/027862 A1 | 2/2016 |
| WO | WO 2017/043590 A1 | 3/2017 |
| WO | WO 2017/043591 A1 | 3/2017 |
| WO | WO 2017/043592 A1 | 3/2017 |

\* cited by examiner

ION EXCHANGE MEMBRANE FOR ALKALI CHLORIDE ELECTROLYSIS, METHOD FOR ITS PRODUCTION AND ALKALI CHLORIDE ELECTROLYSIS APPARATUS

TECHNICAL FIELD

The present invention relates to an ion exchange membrane for alkali chloride electrolysis, a method for its production, an alkali chloride electrolysis apparatus, and a method for producing an alkali hydroxide.

BACKGROUND ART

As an ion exchange membrane to be used for an alkali chloride electrolysis method for electrolyzing an aqueous alkali chloride solution such as saline to produce an alkali hydroxide and chlorine, an electrolyte membrane made of a fluorinated polymer having ion exchange groups (carboxy groups or carboxylate groups, sulfo groups or sulfonate groups) is known.

The electrolyte membrane is usually reinforced by a reinforcing material made of reinforcing threads (polytetrafluoroethylene (hereinafter referred to as PTFE) thread, etc.) with a view to maintaining the mechanical strength or dimensional stability.

As the ion exchange membrane for alkali chloride electrolysis having a reinforcing material, for example, an ion exchange membrane having the following (1) to (4) sequentially laminated is known (Patent Document 1).

(1) A first layer comprising a fluorinated polymer having carboxylic acid functional groups, and having an ion exchange capacity of 0.80 meq/g, (2) a layer A of second layer comprising a fluorinated polymer having sulfonic acid functional groups, and having an ion exchange capacity of 0.98 meq/g, (3) a reinforcing material, and (4) a layer B of second layer comprising a fluorinated polymer having sulfonic acid functional groups, and having an ion exchange capacity of 1.05 meq/g.

Meanwhile, in order to maintain good operating performance for a long period of time in an alkali chloride electrolysis method using an ion exchange membrane for alkali chloride electrolysis as described above, it is important to adjust and maintain the catholyte concentration in the cathode chamber to be in a constant range and uniformly.

A usual method to adjust the concentration is supply of water to the cathode chamber. However, this method results in the following problems. First, if the liquid circulation in the cathode chamber is insufficient, the catholyte concentration in the vicinity where water is supplied, tends to be low, while the catholyte concentration at a portion where it is hardly diluted, inversely tends to be high. As a result, the current efficiency decreases. Also, if supply of water to the cathode chamber stops due to a certain trouble, the catholyte concentration rapidly increases, whereby not only the current efficiency will be remarkably lowered, but also it becomes difficult to return the once lowered current efficiency to the initial state again, and it becomes necessary to change the membrane.

To solve the above problems, it has been proposed to use a membrane having a large water permeability as a membrane capable of suppressing the amount of water supplied to the cathode chamber to be minimum (Patent Document 2). In Examples in Patent Document 2, it is shown that in order to make the membrane to have a large water permeability, it is necessary to reduce the film thickness of the fluorinated polymer layer having carboxylic acid functional groups.

PRIOR ART DOCUMENTS

Patent Documents

Patent Document 1: JP-A-2013-163858
Patent Document 2: Japanese Patent No. 4168932

DISCLOSURE OF INVENTION

Technical Problem

As shown in Patent Document 2, with a view to achieving a high water permeability, it is advantageous to reduce the thickness of the fluorinated polymer layer having carboxylic acid functional groups. However, the present inventors have found that if the thickness of the fluorinated polymer layer having carboxylic acid functional groups is reduced, chloride ions will pass through the ion exchange membrane to deteriorate the caustic alkali quality.

Here, the water permeability is an amount of water moving from the anode side to the cathode side by passing through the ion exchange membrane during the electrolysis of an alkali chloride, and is represented by a molar amount ratio of the water moved per mole of alkali ions. Further, the caustic alkali quality means the purity of the alkali hydroxide in the formed aqueous alkali hydroxide solution, and the caustic alkali quality being high in the present invention means that the content of the alkali chloride to the alkali hydroxide in the aqueous alkali hydroxide solution is small, and it is an aqueous alkaline solution having a high purity of the alkali hydroxide.

It is an object of the present invention to provide an ion exchange membrane for alkali chloride electrolysis which is a membrane whereby the water permeability is large, and the electrolysis voltage during the electrolysis of an aqueous alkali chloride solution is low while suppressing the amount of water supplied to the cathode chamber to be minimum, and which is capable of producing an aqueous alkali hydroxide solution with a high caustic alkali quality.

Solution to Problem

The present invention has the following embodiments.
[1] An ion exchange membrane for alkali chloride electrolysis comprising a layer (C) made of a fluorinated polymer having carboxylic acid functional groups at the surface on a cathode side, and a layer (S) made of a fluorinated polymer having sulfonic acid functional groups at the surface on an anode side, characterized in that a reinforcing material comprising reinforcing threads is disposed in the layer (S) made of a fluorinated polymer having sulfonic acid functional groups,
the thickness when dried, of the layer (C) made of a fluorinated polymer having carboxylic acid functional groups is from 9 to 28 µm,
in the layer (S) made of a fluorinated polymer having sulfonic acid functional groups,
a layer (Sb) located on the anode side of the reinforcing material includes a layer made of a fluorinated polymer having sulfonic acid functional groups with an ion exchange capacity of from 1.3 to 2.5 meq/g, and has a thickness when dried, of from 6 to 100 µm, and a layer (Sa) located on the cathode side of the reinforcing material includes a layer made of a fluorinated polymer having sulfonic acid functional groups with an ion exchange capacity of from 0.9 to 1.25 meq/g, and has a thickness when dried, of from 40 to 110 µm.

[2] The ion exchange membrane according to [1], wherein at least a part of the fluorinated polymer having sulfonic acid functional groups constituting the layer (Sb) made of a fluorinated polymer having sulfonic acid functional groups located on the anode side of the reinforcing material is a polymer having structural units represented by the following formula (U1):

(U1)

wherein $Q^1$ is a perfluoroalkylene group which may have an etheric oxygen atom, $Q^2$ is a single bond or a perfluoroalkylene group which may have an etheric oxygen atom, $Rf^1$ is a perfluoroalkyl group which may have an etheric oxygen atom, $X^1$ is an oxygen atom, a nitrogen atom or a carbon atom, when $X^1$ is an oxygen atom, a is 0, when $X^1$ is a nitrogen atom, a is 1, when $X^1$ is a carbon atom, a is 2, $Y^1$ is a fluorine atom or a monovalent perfluoro organic group, r is 0 or 1, and M is a hydrogen atom, an alkali metal or a quaternary ammonium base.

[3] The ion exchange membrane according to [2], wherein the structural units represented by the formula (U1) are structural units based on a monomer represented by the formula (M1):

(M1)

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

[4] The ion exchange membrane according to any one of [1] to [3], wherein the ion exchange capacity of at least a part of the fluorinated polymer having carboxylic acid functional groups constituting the layer (C) made of a fluorinated polymer having carboxylic acid functional groups is from 0.5 to 2.0 meq/g.

[5] The ion exchange membrane according to any one of [1] to [4], wherein the layer (Sa) located on the cathode side of the reinforcing material is a layer composed of two or more layers.

[6] The ion exchange membrane according to [5], wherein among the layers forming the layer (Sa) located on the cathode side of the reinforcing material, a layer (Sa-1) located on the most cathode side is a layer made of a fluorinated polymer having sulfonic acid functional groups with a thickness when dried, of from 1 to 55 µm and an ion exchange capacity of from 0.9 to 1.25 meq/g.

[7] The ion exchange membrane according to any one of [1] to [6], wherein the reinforcing material comprises reinforcing threads and sacrificial threads.

[8] The ion exchange membrane according to any one of [1] to [7], which further has an inorganic particle layer at the outermost surface of at least one side.

[9] A method for producing an ion exchange membrane for alkali chloride electrolysis as defined in any one of [1] to [8], characterized by laminating a layer (C') made of a fluorinated polymer having groups convertible to carboxylic acid functional groups, a layer (S'a) made of a fluorinated polymer having groups convertible to sulfonic acid functional groups, a reinforcing fabric and a layer (S'b) made of a fluorinated polymer having groups convertible to sulfonic acid functional groups, in this order to obtain a reinforced precursor membrane, and then, contacting the reinforced precursor membrane with an aqueous alkaline solution, to convert the groups convertible to ion exchange groups in the reinforced precursor membrane to ion exchange groups.

[10] The method according to [9], wherein the reinforcing fabric is made of reinforcing threads and sacrificial threads, and the reinforcing precursor membrane is brought in contact with an aqueous alkaline solution to convert the groups convertible to ion exchange groups to ion exchange groups, and to dissolve at least a part of the reinforcing threads in the reinforcing fabric to form a reinforcing material.

[11] The method according to [9], wherein the aqueous alkaline solution is a mixture of a water-soluble organic compound, a hydroxide of an alkali metal and water.

[12] An alkali chloride electrolysis apparatus characterized by comprising an electrolytic bath provided with a cathode and an anode, and an ion exchange membrane for alkali chloride electrolysis as defined in any one of [1] to [8] that partitions a cathode chamber on the cathode side and an anode chamber on the anode side in said electrolytic bath.

[13] A method for producing an alkali hydroxide, characterized by electrolyzing an alkali chloride by using the alkali chloride electrolysis apparatus as defined in [12].

[14] The method according to [13], wherein the alkali chloride is electrolyzed while supplying oxygen to the cathode chamber.

[15] The method for producing an alkali hydroxide according to [13] or [14], wherein the content of the alkali chloride to the alkali hydroxide to be produced, is at most 25 ppm.

Advantageous Effects of Invention

The ion exchange membrane for alkali chloride electrolysis of the present invention is a membrane whereby the water permeability is large, and the electrolysis voltage during the electrolysis of an aqueous alkali chloride solution is low while suppressing the amount of water supplied to the cathode chamber to be minimum, and it is possible to produce an aqueous alkali hydroxide solution with a high caustic alkali quality.

According to the method for producing an ion exchange membrane for alkali chloride electrolysis of the present invention, it is possible to produce an ion exchange membrane for alkali chloride electrolysis whereby the water permeability is large, and the electrolysis voltage during the electrolysis of an aqueous alkali chloride solution is low while suppressing the amount of water supplied to the cathode chamber to be minimum, and it is possible produce an aqueous alkali hydroxide solution with a high caustic alkali quality.

By the alkali chloride electrolysis apparatus of the present invention, it is possible to produce an aqueous alkali hydroxide solution with a high caustic alkali quality at a low electrolysis voltage during the electrolysis of an aqueous alkali chloride solution, while suppressing the amount of water supplied to the cathode chamber to be minimum.

By the method for producing an alkali hydroxide of the present invention, it is possible to produce an aqueous alkali hydroxide solution with a high caustic alkali quality at a low electrolysis voltage during the electrolysis of an aqueous alkali chloride solution, while suppressing the amount of water supplied to the cathode chamber to be minimum.

DESCRIPTION OF EMBODIMENTS

The following definitions of terms apply throughout the specification including claims, unless otherwise stated.

An "ion exchange group" is such a group that at least some of ions contained in that group can be exchanged for other ions. It may, for example, be the following carboxylic acid functional group, sulfonic acid functional group, etc.

A "carboxylic acid functional group" means a carboxy group (-COOH) or a carboxylic acid salt group (-COOM$^1$, where M$^1$ is an alkali metal or a quaternary ammonium salt).

A "sulfonic acid functional group" means a sulfo group (—SO$_3$H) or a sulfonate group (-SO$_3$M$^2$, where M$^2$ is an alkali metal or a quaternary ammonium salt).

A "precursor membrane" is a membrane comprising a polymer having groups convertible to ion exchange groups.

The "groups convertible to ion exchange groups" mean groups convertible to ion exchange groups by known treatment such as hydrolysis treatment, acid form conversion treatment, etc.

The "groups convertible to carboxylic acid functional groups" mean groups convertible to carboxylic acid functional groups by known treatment such as hydrolysis treatment, acid form conversion treatment, etc.

The "groups convertible to sulfonic acid functional groups" mean groups convertible to sulfonic acid functional groups by known treatment such as hydrolysis treatment, acid form conversion treatment, etc.

The "meq/g dry resin" being the unit for the ion exchange capacity may be referred to simply as "meq/g".

A "perfluorocarbon polymer" means such a polymer that all of hydrogen atoms bonded to carbon atoms in a polymer are substituted by fluorine atoms. Some of fluorine atoms in the perfluorocarbon polymer may optionally be substituted by one or both of chlorine atoms and bromine atoms.

A "perfluoromonomer" means such a monomer that all of hydrogen atoms bonded to carbon atoms in a monomer are substituted by fluorine atoms.

A "structural unit" means a polymerized unit derived from a monomer, which is present in a polymer to constitute the polymer. For example, in a case where a structural unit is formed by addition polymerization of a monomer having a carbon-carbon unsaturated double bond, such a structural unit is a divalent structural unit formed by cleavage of the unsaturated double bond. Further, a structural unit may be a structural unit obtained by forming a polymer having a structure of a certain structural unit, followed by chemically converting the structural unit, e.g. by hydrolysis treatment. In the following, in some cases, a structural unit derived from an individual monomer may be identified by a name having "unit" attached to the monomer name.

A "reinforcing material" means a material to be used to improve the strength of an ion exchange membrane. The reinforcing material is a material derived from a reinforcing fabric.

A "reinforcing fabric" means a fabric which is used as a raw material of a reinforcing material to improve the strength of an ion exchange membrane.

A "reinforcing thread" is a thread that constitutes a reinforcing fabric, and is made of a material which will not be eluted even when the reinforcing fabric is immersed in an aqueous alkaline solution (e.g. an aqueous sodium hydroxide solution with a concentration of 32 mass %).

A "sacrificial thread" is a thread that constitutes a reinforcing fabric, and is made of a material which will be, when the reinforcing fabric is immersed in an aqueous alkaline solution, eluted in the aqueous alkaline solution.

The "elution holes" means holes formed as a result of elution of sacrificial threads in an aqueous alkaline solution.

A "reinforced precursor membrane" means a membrane having a reinforcing fabric disposed in a precursor membrane.

[Ion Exchange Membrane for Alkali Chloride Electrolysis]

The ion exchange membrane for alkali chloride electrolysis of the present invention comprises a layer (hereinafter referred to also as a layer (C)) made of a fluorinated polymer having carboxylic acid functional groups (hereinafter referred to also as a fluorinated polymer (C)) and a layer (hereinafter referred to also as a layer (S)) made of a fluorinated polymer having sulfonic acid functional groups (hereinafter referred to also as a fluorinated polymer (S)), and a reinforcing material comprising reinforcing threads, is disposed in the layer (S). Here, the reinforcing material may contain sacrificial threads in addition to the reinforcing threads. Further, in the ion exchange membrane for alkali chloride electrolysis of the present invention, elution holes may be formed by elution of the sacrificial threads.

Figure 1:
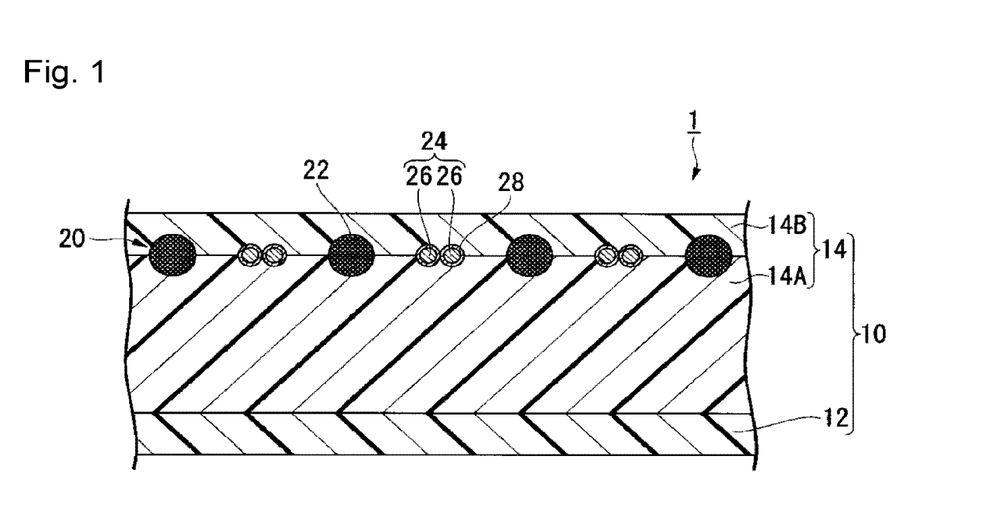
FIG. 1 is a schematic cross-sectional view showing an example of the ion exchange membrane for alkali chloride electrolysis of the present invention.

FIG. 1 is a schematic cross-sectional view showing an example of the ion exchange membrane for alkali chloride electrolysis of the present invention. An ion exchange membrane 1 for alkali chloride electrolysis (hereinafter referred to also as an ion exchange membrane 1) is one having an electrolyte membrane 10 made of a fluorinated polymer having ion exchange groups, reinforced by a reinforcing material 20.

(Electrolyte Membrane)

The electrolyte membrane 10 is a laminate comprising a layer (C) 12 and a layer (S) 14. In the layer (S) 14, a reinforcing material 20 comprising reinforcing threads is disposed.

The thickness of each layer when dried, in the ion exchange membrane 1, is determined by means of an imaging software as described later, by observing the cross section of the ion exchange membrane by an optical microscope, after drying the ion exchange membrane at 90° C. for 4 hours. Further, in a case where a reinforcing fabric or reinforcing material is present between layers, the thickness of each layer is measured at a position where reinforcing threads or sacrificial threads constituting the reinforcing fabric or reinforcing material are not present.

<Layer (C)>

The layer (C) 12 is preferably a layer made solely of a fluorinated polymer (C) and containing no other material than the fluorinated polymer (C), from the viewpoint of the electrolytic performance. In FIG. 1, the layer (C) 12 is shown as a single layer, but it may be a layer formed of a plurality of layers. When the layer (C) 12 is formed of a plurality of layers, the construction may be such that in the respective layers, the type of structural units constituting the fluorinated polymer (C), or the proportion of structural units having carboxylic acid functional groups may be different.

The thickness of the layer (C) 12 when dried (when the layer (C) 12 is formed of a plurality of layers, their total) is from 9 to 28 μm, preferably from 9 to 22 μm. Together with the ion exchange capacity, the thickness of the layer (C) is influential to the water permeability of the ion exchange membrane, and particularly in the case where the thickness of the layer (C) is thin, the water permeability of the ion exchange membrane becomes high. On the other hand, together with the ion exchange capacity, the thickness of the layer (C) is highly influential to the caustic alkali quality of an aqueous alkali hydroxide solution obtainable by electrolysis. In the case where the thickness of the layer (C) is thin, although the water permeability of the ion exchange membrane becomes high, chlorine ions tend to easily permeate through the ion exchange membrane, and the chlorine ion concentration in the obtainable aqueous alkali hydroxide solution will increase. In order to maintain the high caustic alkali quality, it is important that the thickness of layer (C) 12 is at least the above lower limit value.

On the other hand, the layer (C) is highly influential to the electrolysis voltage, and if the thickness is thick, the electrolysis voltage will be largely increased. That is, it is important that the thickness of the layer (C) 12 when dried, is at most the above upper limit value, so that it is possible to suppress the membrane resistance of the ion exchange membrane 1 to be low, and to suppress an increase in the electrolysis voltage.

The fluorinated polymer (C) constituting the layer (C) 12 has an ion exchange capacity of preferably from 0.5 to 2.0 meq/g, more preferably from 0.6 to 2.0 meq/g, further preferably from 0.7 to 2.0 meq/g. In a case where the layer (C) 12 is formed of a plurality of layers, it is preferred that the ion exchange capacity of all fluorinated polymers (C) constituting the layer (C) 12 is in the above range. Further, it is preferred that the layer (C) 12 is formed of a single layer, and the ion exchange capacity of the polymer constituting that layer is in the above range. When the ion exchange capacity of the fluorinated polymer (C) is at least the above lower limit value, the electrical resistance of the ion exchange membrane during the electrolysis of an aqueous alkali chloride solution will be low, and it is possible to obtain an ion exchange membrane whereby the electrolysis voltage is low. When the ion exchange capacity of the fluorinated polymer (C) is at most the above upper limit value, the synthesis of a fluorinated polymer (C) having a high molecular weight will be easy, and it is possible to increase the mechanical strength of the layer (C) 12. Further, it is possible to suppress excessive swelling of the fluorinated polymer (C), and thus to obtain an ion exchange membrane whereby current efficiency is less likely to decrease.

Further, as mentioned above, the ion exchange capacity of the fluorinated polymer (C) constituting the layer (C) 12, is influential, together with its thickness, to the water permeability of the ion exchange membrane. When the ion exchange capacity of the fluorinated polymer (C) is at least the above lower limit value, it is less likely to lower the water permeability by sufficiently permeating water having passed through the layer (S) as described later.

It is preferred that the layer (C) 12 is prepared by converting a layer (hereinafter referred to also as a layer (C')) made of a fluorinated polymer having groups convertible to carboxylic acid functional groups, constituting a reinforcing precursor membrane as described later, to the layer (C) 12, via step (i-b) as described later. That is, the fluorinated polymer (C) constituting the layer (C) 12 is preferably obtained by converting, in step (i-b) as described later, groups convertible to carboxylic acid functional groups, of a fluorinated polymer having the groups convertible to carboxylic acid functional groups as described later, to the carboxylic acid functional groups.

The fluorinated polymer (C) is, for example, preferably a fluorinated polymer obtained by converting groups convertible to carboxylic acid functional groups in a copolymer (hereinafter referred to also as a fluorinated polymer (C')) of a monomer (hereinafter referred to also as a monomer (C')) having fluorine atoms and a group convertible to a carboxylic acid functional group, and a fluorinated olefin, being a copolymer constituting the layer (C'), to carboxylic acid functional groups by hydrolysis treatment, etc.

The fluorinated monomer (C') is not particularly limited so long as it is a monomer having at least one fluorine atom in the molecule, having an ethylenic double bond and having a group convertible to a carboxylic acid functional group, and a conventional one may be employed.

The fluorinated monomer (C') is preferably one represented by the following formula (1) from the viewpoint of the production cost, the reactivity with other monomers, and excellent properties of the obtainable fluorinated polymer.

In the formula (1), the symbols have the following meanings.

X and X' are each independently a fluorine atom or a trifluoromethyl group.

$A^1$ is a group convertible to a carboxylic acid functional group. Specifically, —CN, —COF, —COOR$^1$ (R$^1$ is a C$_{1-10}$ alkyl group), or —COONR$^2$R$^3$ (R$^2$ and R$^3$ are each independently a hydrogen atom or a C$_{1-10}$ alkyl group) may be mentioned.

p is 0 or 1. q is an integer of from 0 to 12. r is an integer of from 0 to 3. s is 0 or 1. t is an integer of from 0 to 12. u is an integer of from 0 to 3. However, p and s will not be 0 at the same time, and r and u will not be 0 at the same time. That is, 1≤p+s, and 1≤r+u.

Specific examples of the fluorinated monomer represented by the formula (1) include the following compounds, and from such a viewpoint that the production is easy, preferred are compounds wherein p=1, q=0, r=1, s=0 to 1, t=0 to 3, and u=0 to 1.

As the fluorinated monomer (C'), one type may be used alone, or two or more types may be used in combination.

The fluorinated olefin may, for example, be a $C_{2-3}$ fluoroolefin having at least one fluorine atom in the molecule. The fluoroolefin may be tetrafluoroethylene ($CF_2$=$CF_2$) (hereinafter referred to as TFE), chlorotrifluoroethylene ($CF_2$=CFCl), vinylidene fluoride ($CF_2$=$CH_2$), vinyl fluoride ($CH_2$=CHF), hexafluoropropylene ($CF_2$=$CFCF_3$), etc. Among them, from the viewpoint of the production cost of the monomer, the reactivity with other monomers, and excellent properties of the obtainable fluorinated polymer, TFE is particularly preferred. As the fluorinated olefin, one type may be used alone, or two or more types may be used in combination.

For the production of the fluorinated polymer (C'), in addition to a fluorinated monomer (C') and a fluorinated olefin, other monomers may further be used. Other monomers may be $CF_2$=$CFR^f$ (where $R^f$ is a $C_{2-10}$ perfluoroalkyl group), $CF_2$=CF—$OR^{f1}$ (where $R^{f1}$ is a $C_{1-10}$ perfluoroalkyl group), $CF_2$=$CFO(CF_2)_vCF$=$CF_2$ (where v is an integer of from 1 to 3), etc. By copolymerizing other monomers, it is possible to increase the flexibility or mechanical strength of the ion exchange membrane. The proportion of other monomers is, with a view to maintaining the ion exchange performance, preferably at most 30 mol % in all structural units (100 mol %) in the fluorinated polymer (C').

The ion exchange capacity of the fluorinated polymer (C) can be adjusted by changing the content of structural units derived from a fluorinated monomer (C') in the fluorinated polymer (C')). The content of carboxylic acid functional groups in the fluorinated polymer (C) is preferably the same as the content of groups convertible to carboxylic acid functional groups in the fluorinated polymer (C').

TQ value of the fluorinated polymer (C) is, from the viewpoint of mechanical strength and membrane-forming properties as an ion exchange membrane, preferably at least 150° C., more preferably from 170 to 340° C., further preferably from 170 to 300° C.

TQ value is a value which relates to the molecular weight of the polymer and is one represented by a temperature at which the volume flow rate shows 100 mm³/sec. The volume flow rate is one such that the amount of the polymer flowing out at the time of letting the polymer be melted and flow out from an orifice (diameter: 1 mm, length: 1 mm) at a constant temperature under a pressure of 3 MPa, is represented by a unit of mm³/sec. The higher the TQ value, the higher the molecular weight.

<Layer (S)>

The layer (S) 14 is, from the viewpoint of the electrolytic performance, preferably a layer made solely of a fluorinated polymer (S) not containing a material other than the fluorinated polymer (S). As shown in FIG. 1, in the layer (S) 14, a reinforcing material 20 is disposed in order to enhance the mechanical strength of the ion exchange membrane 1. Of the layer (S) 14, a layer located on the cathode side of the reinforcing material 20 is a layer (Sa) 14A, and a layer located on the anode side of the reinforcing material 20 is a layer (Sb) 14B. In FIG. 1, the layer 14A and the layer 14B are each shown as a single layer, but they may each be formed of a plurality of layers. In a case where one or both of the layers 14A and layer 14B are formed of a plurality of layers, the construction may be such that in the respective layers, the types of structural units constituting the fluorinated polymers (S) or the proportions of the structural units having sulfonic acid functional groups, are different.

The thickness of the layer 14A when dried (in a case where the layer 14A is formed of a plurality of layers, their total) is from 40 to 110 μm, preferably from 50 to 90 μm, more preferably from 60 to 90 μm. When said thickness is at least the above lower limit value, the mechanical strength of the ion exchange membrane 1 will be sufficiently high. When said thickness is at most the above upper limit value, the membrane resistance of the ion exchange membrane 1 will be low. In order to let both the electrolysis voltage and the mechanical strength be satisfied, it is very important that the thickness is in the above range.

The layer (Sa) 14A includes a layer made of a fluorinated polymer (S) having sulfonic acid functional groups with an ion exchange capacity of from 0.9 to 1.25 meq/g. The ion exchange capacity of the fluorinated polymer (S) having sulfonic acid functional groups to form a layer contained in the layer (Sa) 14A is preferably from 1.0 to 1.25 meq/g, more preferably from 1.0 to 1.1 meq/g. In a case where the layer (Sa) 14A is formed of a plurality of layers, it is preferred that the ion exchange capacity of all fluorinated polymers (S) constituting the layer (Sa) 14A is in the above range. The layer (Sa) 14A is preferably made of a plurality of layers, more preferably made of two layers. In another embodiment, the layer (Sa) 14A is preferably a single layer.

When the ion exchange capacity of the fluorinated polymer (S) contained in the layer (Sa) 14A is at least the above lower limit value, it is possible to suppress excessive swelling of the fluorinated polymer (S), the electrical resistance of the ion exchange membrane will be low, and the electrolysis voltage at the time of electrolyzing an aqueous alkali chloride solution will be low. Further, in the case of the fluorinated polymer (S) having an ion exchange capacity being at most the above upper limit value, it is easy to increase the molecular weight of the fluorinated polymer (S) during the polymerization. When the fluorinated polymer (S) with a high molecular weight is used in the layer (Sa), the mechanical strength of the layer (Sa) will be high.

The thickness of the layer (Sb) 14B when dried (in a case where the layer 14B is composed of a plurality of layers, their total) is from 6 to 100 μm, preferably from 6 to 50 μm, more preferably from 10 to 40 μm, further preferably from 15 to 35 μm. If the thickness of the layer 14B is too thin, the reinforcing material present directly below the layer 14B will be positioned extremely close to the surface of the ion exchange membrane, whereby the peeling resistance or mechanical strength will be low.

Therefore, when the thickness of the layer 14B is at least the above lower limit value, the reinforcing material 20 will be disposed at the proper position in depth from the surface of the electrolyte membrane 10, and the peeling resistance of the reinforcing material 20 will be excellent. Further, since cracking is less likely to occur at the surface of the electrolyte membrane 10, the mechanical strength will be excellent. If the thickness of the ion exchange membrane is thick, the membrane resistance tends to be high, and therefore, when the thickness of the layer 14B is at most the above upper limit value, the membrane resistance will be low, and it is possible to suppress an increase in the electrolysis voltage.

The layer (Sb) 14B includes a layer made of a fluorinated polymer (S) having sulfonic acid functional groups with an ion exchange capacity of from 1.3 to 2.5 meq/g. The ion exchange capacity of the fluorinated polymer (S) having sulfonic acid functional groups to form a layer 14B is preferably from 1.3 to 2.2 meq/g, more preferably from 1.3 to 2.0 meq/g. When the layer 14B is formed of a plurality of layers, it is preferred that the ion exchange capacity of at least the fluorinated polymer (S) constituting the layer positioned at the most anode side is in the above range, and it is more preferred that the ion exchange capacity of all fluorinated polymers (S) constituting the layer 14B is in the above range. Further, in another embodiment, the layer 14B is made of a single layer, and it is preferred that the ion exchange capacity of the fluorinated polymer (S) constituting that layer is in the above range.

In the present invention, the water permeability of the ion exchange membrane has been found to be more largely influenced by the ion exchange capacity of the layer (Sb) than by the ion exchange capacity of the layer (C) or the ion exchange capacity of the layer (Sa). The higher the ion exchange capacity of the layer (Sb), the higher the degree of swelling of the fluorinated polymer (S), and the larger the water permeability as a whole of the ion exchange membrane. That is, when the ion exchange capacity of the fluorinated polymer (S) contained in the layer (Sb) 14B is at least the above lower limit value, the water permeability of the ion exchange membrane will be high, the concentration distribution of the catholyte in the cathode chamber of the electrolytic bath becomes uniform, and as a result, it is possible to maintain the electrolysis efficiency to be high. When the ion exchange capacity of the fluorinated polymer (S) contained in the layer (Sb) 14B is at most the above upper limit value, as described above, since the fluorinated polymer (S) has a high molecular weight and has a high mechanical strength, it is possible to maintain the high membrane strength and to suppress membrane breakage during the electrolysis operation or at the time of mounting the membrane.

At least a part of the fluorinated polymer having sulfonic acid functional groups constituting the layer (Sb) 14B, is preferably a fluorinated polymer having structural units based on a fluorinated monomer having at least two, preferably two, sulfonic acid functional groups. By doing so, the ion exchange group content per fluorinated monomer unit will be increased. Therefore, as compared with a fluorinated polymer having units based on a fluorinated monomer having only one sulfonic functional group, it is possible to form a layer (Sb) having a higher ion exchange capacity even with a small content of fluorinated monomer units.

As the structural units based a fluorinated monomer having at least two sulfonic acid functional groups, structural units represented by the following formula (U1) are preferred.

The meanings of the respective symbols in the formula (U1) are as described above. Among them, $X^1$ is preferably an oxygen atom, and $Y^1$ is preferably a fluorine atom. The organic group means a group containing at least one carbon atom.

It is preferred that the layer (Sa) 14A is prepared by converting a layer (hereinafter referred to also as a layer (S'a)) made of a fluorinated polymer having groups convertible to sulfonic acid functional groups, constituting a reinforced precursor membrane as described later, to the layer (Sa) 14a, via step (i-b) as described later. Further, it is preferred that the layer (Sb) 14B is prepared by converting a layer (hereinafter referred to also as a layer (S'b)) made of a fluorinated polymer having groups convertible to sulfonic acid functional groups, constituting a reinforced precursor membrane as described later, to the layer (Sb) 14B, via step (i-b) as described later. That is, the fluorinated polymer (S) constituting the layer (S) comprising the layer (Sa) and the layer (Sb) is preferably obtained by converting, in step (i-b) as described later, groups convertible to sulfonic acid functional groups, of the fluorinated polymer having the groups convertible to sulfonic acid functional groups, as described later, to the sulfonic acid functional groups.

As the fluorinated polymer (S), preferred is, for example, a fluorinated polymer obtained by converting groups convertible to sulfonic acid groups in a copolymer (hereinafter referred to also as a fluorinated polymer (S')) of a monomer (hereinafter referred to also as a fluorinated monomer (S')) having fluorine atoms and a group convertible to a sulfonic acid functional group, and a fluorinated olefin, being a copolymer constituting the layer (S'a) and the layer (S'b), to sulfonic acid functional groups by hydrolysis treatment, etc.

The fluorinated monomers (S') is not particularly limited, so long as it is a monomer having at least one fluorine atom in the molecule, having an ethylenic double bond and having a group convertible to a sulfonic acid functional group, and a known conventional one may be employed.

As the fluorinated monomer (S'), from the viewpoint of the production cost of the monomer, the reactivity with other monomers and excellent properties of the obtainable fluorinated polymer, preferred is a fluorinated monomer represented by the following formula (2) or the following formula (3).

The symbols in the formula (2) and the formula (3) have the following meanings. $R^{f2}$ is a $C_{1-20}$ perfluoroalkyl group, which may contain an etheric oxygen atom and may be linear or branched. $A^2$ is a group convertible to a sulfonic acid functional group. Specifically, it may be $-SO_2F$, $-SO_2Cl$, $-SO_2Br$, etc.

Specific examples of the fluorinated monomer represented by the formula (2) may be $CF_2=CF-O-(CF_2)_w-SO_2F$, $CF_2=CF-O-CF_2CF(CF_3)-O-(CF_2)_w-SO_2F$, $CF_2=CF-[O-CF_2CF(CF_3)]_x-SO_2F$, etc. In the formulae, w is an integer of from 1 to 8, and x is an integer of from 1 to 5.

Specific examples of the fluorinated monomer represented by the formula (3) may be $CF_2=CF-(CF_2)_w-SO_2F$, $CF_2=CF-CF_2-O-(CF_2)_w-SO_2F$, etc. In the formulae, w is an integer of from 1 to 8.

As the fluorinated monomer (S'), from such a viewpoint that the industrial synthesis is easy, the following ones are preferred.
$CF_2=CF-O-CF_2CF_2-SO_2F$, $CF_2=CF-O-CF_2CF_2CF_2-SO_2F$, $CF_2=CF-O-CF_2CF_2CF_2CF_2-SO_2F$, $CF_2=CF-O-CF_2CF(CF_3)-O-CF_2CF_2-SO_2F$, $CF_2=CF-O-CF_2CF(CF_3)-O-CF_2CF_2CF_2-SO_2F$, $CF_2=CF-O-CF_2CF(CF_3)-SO_2F$, $CF_2=CF-CF_2CF_2-SO_2F$, $CF_2=CF-CF_2CF_2CF_2-SO_2F$, $CF_2=CF-CF_2-O-CF_2CF_2-SO_2F$.

As the fluorinated monomer (S'), one type may be used alone, or two or more types may be used in combination.

In a case where the layer (Sb) comprises a fluorinated polymer having structural units based on a fluorinated monomer having at least two sulfonic acid functional groups, as such a fluorinated monomer (S'), it is possible to use a fluorinated monomer having at least one fluorine atom in the molecule, having an ethylenic double bond and at least two groups convertible to sulfonic acid functional groups.

As such a fluorinated monomer, preferred is a fluorinated monomer whereby structural units of the above-mentioned formula (U1) are obtainable. As such a fluorinated monomer, preferred is one represented by the following formula (m1), and specifically, more preferred is one represented by the following formula (m11), the following formula (m12) or the following formula (m13).

In the formula (m1), r is 0 or 1, $R^{F11}$ is a single bond or a $C_{1-6}$ linear perfluoroalkylene group which may have an etheric oxygen atom, and $R^{F12}$ is a $C_{1-6}$ linear perfluoroalkylene group.

Here, the monomer unit represented by the formula (m1) is a structural unit of the formula (U1) wherein $Q^2$ is $OCF_2R^{F12}$ (a perfluoroalkylene group which may have an etheric oxygen atom), $Q^1$ is $R^{F11}$ (a single bond or a perfluoroalkylene group which may have an etheric oxygen atom), $SO_2X^1(SO_2R^{f1})_aM$ is $SO_2F$ or a sulfonic acid functional group ($X^1$ is an oxygen atom, a is 0, M is hydrogen, an alkali metal or a quaternary ammonium base) obtainable by subjecting $SO_2F$ to hydrolysis treatment or acid form conversion treatment, and $Y^1$ is a fluorine atom.

By using a monomer having at least two sulfonic acid functional groups, it becomes possible to increase the ion exchange group concentration per unit weight at the same monomer concentration, and thus, it becomes easy to increase the ion exchange capacity of the polymer constituting the layer (Sb) without reducing the polymer molecular weight. As a result, it is possible to obtain a membrane whereby the water permeability is high and the electrolysis voltage is low, while maintaining the caustic alkali quality.

As the fluorinated olefin, the above exemplified ones may be mentioned, and from the viewpoint of the production cost, the reactivity with other monomers and excellent properties of the obtainable fluorinated polymer, TFE is particularly preferred. As the fluorinated olefin, one type may be used alone, or two or more types may be used in combination.

In the production of the fluorinated polymer (S'), in addition to the fluorinated monomer (S') and the fluoroolefin, other monomers may be further used. Other monomers may be the above-exemplified ones. By copolymerizing other monomers, it is possible to increase the flexibility and mechanical strength of the ion exchange membrane 1. The proportion of other monomers is, with a view to maintaining the ion exchange performance, preferably at most 30 mol % in all structural units (100 mol %) in the fluorinated polymer (S').

The ion exchange capacity of the fluorinated polymer (S) can be adjusted by changing the content of structural units derived from the fluorinated monomer (S') in the fluorinated polymer (S'). The content of sulfonic acid functional groups in the fluorinated polymer (S) is preferably the same as the content of the groups convertible to sulfonic acid functional groups in the fluorinated polymer (S').

TQ value of the fluorinated polymer (S') is, from the viewpoint of the mechanical strength and membrane-forming properties as an ion exchange membrane, preferably at least 150° C., more preferably from 170 to 340° C., further preferably from 170 to 300° C.

Figure 2:
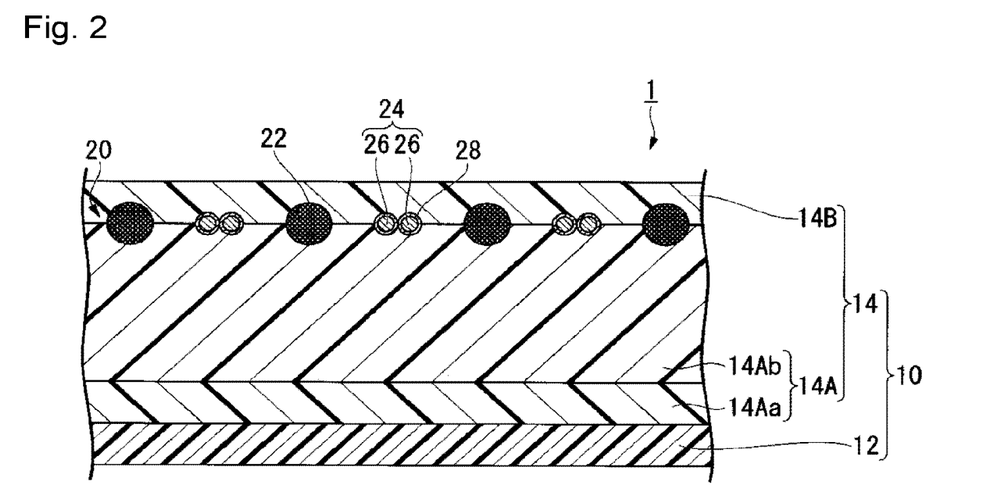
FIG. 2 is a schematic cross-sectional view showing an example of the ion exchange membrane for alkali chloride electrolysis of the present invention.

In a case where the layer (Sa) 14A is composed of a plurality of layers, e.g. two layers, as shown in FIG. 2, a layer in contact with the layer (C) 12 is a layer (Sa-1) 14Aa (hereinafter referred to also as a layer (Sa-1)), and a layer in contact with the layer (Sb) 14B is a layer (Sa-2) 14Ab (hereinafter referred to also as a layer (Sa-2)). In this case, from the viewpoint of adhesion of the layer 14Aa to the layer 12, the ion exchange capacity of the fluorinated polymer (S) constituting the layer (Sa-1) is preferably lower than the ion exchange capacity of the fluorinated polymer (S) constituting the layer (Sa-2). The ion exchange capacity of the layer (Sa-1) is preferably from 0.9 to 1.25 meq/g, more preferably from 0.9 to 1.15 meq/g.

From the viewpoint of the adhesion, the ion exchange capacity of the fluorinated polymer (S) constituting the layer (Sa-1) is preferably close to the ion exchange capacity of the fluorinated polymer (C) constituting the layer (C). Specifically, the difference between the ion exchange capacity of the fluorinated polymer (S) constituting the layer (Sa-1) and the ion exchange capacity of the fluorinated polymer (C) constituting the layer (C) is preferably at most 0.5 meq/g, more preferably at most 0.35 meq/g.

The thickness of the layer (Sa-1) when dried, may be any appropriate thickness of a level contributing to the adhesion, and is preferably from 1 to 55 μm, more preferably from 1 to 40 μm.

(Reinforcing Material)

The reinforcing material 20 is a material to reinforce the electrolyte membrane 10 and is derived from a reinforcing fabric. The reinforcing fabric is composed of a warp and a weft, and it is preferred that the warp and the weft are orthogonal. The reinforcing fabric is preferably composed of reinforcing threads and sacrificial threads.

Reinforcing threads are threads made of a material which will not be eluted even if the reinforced precursor membrane is immersed in an aqueous alkaline solution. Even after sacrificial threads are eluted from the reinforcing fabric by immersing the reinforced precursor membrane in an aqueous alkaline solution, the reinforcing threads will remain undissolved as threads constituting the reinforcing material, and will contribute to the maintenance of the mechanical strength and dimensional stability of the ion-exchange membrane.

The reinforcing threads 22 are preferably threads comprising a perfluorocarbon polymer, more preferably threads comprising PTFE, further preferably threads composed solely of PTFE.

Sacrificial threads are threads which will be at least partially eluted when the reinforced precursor membrane is immersed in an aqueous alkaline solution. The sacrificial threads are effective not only for preventing misalignment at the time of weaving a reinforcing fabric, but also for reducing the electrical resistance of the ion exchange membrane to reduce the electrolysis voltage by being at least partially eluted from the reinforced precursor membrane. The sacrificial threads may be monofilaments or multifilaments.

The sacrificial threads 24 are preferably PET threads made of PET alone, PET/PBT threads made of a mixture of PET and polybutylene terephthalate (PBT), PBT threads made of PBT alone, or PTT threads made of polytrim ethylene terephthalate (PTT) alone, and PET threads are more preferred.

The ion exchange membrane for alkali chloride electrolysis of the present invention is produced via the following steps (i), and then placed in an electrolytic bath in the following step (ii).

Step (i): a step of laminating a layer (C') made of a fluorinated polymer having groups convertible to carboxylic acid functional groups, a layer (S'a) made of a fluorinated polymer having groups convertible to sulfonic acid functional groups, a reinforcing fabric and a layer (S'b) made of a fluorinated polymer having groups convertible to sulfonic acid functional groups, to obtain a reinforced precursor membrane, and then letting the reinforced precursor membrane be in contact with an aqueous alkaline solution to convert the groups convertible to ion exchange groups in the reinforced precursor membrane, to the ion exchange groups.

Step (ii): a step of placing the ion exchange membrane obtained via step (i) in an electrolytic bath, followed by conditioning operation before the operation of the alkali chloride electrolysis.

In the case where the reinforcing fabric is made of reinforcing threads and sacrificial threads, when contacted in an aqueous alkaline solution in step (i), at least a part of sacrificial threads of the reinforcing fabric in the reinforced precursor membrane will be eluted, and thus, the reinforcing material 20 will be composed of reinforcing threads 22 and optionally contained sacrificial threads 24. If a part of the sacrificial threads 24 will be dissolved, the reinforcing material 20 will be composed of reinforcing threads 22 and sacrificial threads 24 remained as undissolved, and if all of sacrificial threads 24 will be dissolved, the reinforcing material 20 will be composed solely of reinforcing threads 22.

In step (i), at least a part of sacrificial threads 24 will be eluted and as a result, elution holes 28 will be formed. The ion exchange membrane obtained via step (i) is subjected to step (ii), and therefore, even if there may be sacrificial threads 24 remained undissolved in step (i), such remaining sacrificial threads 24 will be mostly, preferably entirely, removed as eluted in an aqueous alkaline solution in step (ii).

In the ion exchange membrane 1, as shown in FIG. 1, it is preferred that even after step (i), a part of sacrificial threads 24 will remain, so that elution holes 28 are formed around the dissolution residues of filaments 26 of the sacrificial threads 24. Thus, the ion exchange membrane 1 is less susceptible to rupture such as cracking in handling of the ion exchange membrane 1 after the production of the ion exchange membrane 1 and before the conditioning operation of alkali chloride electrolysis, or at the time of installation of the ion exchange membrane 1 in an electrolytic bath at the time of the conditioning operation.

Even if a part of sacrificial threads 24 remains after step (i), the remaining sacrificial threads 24 will be eluted in an aqueous alkaline solution in step (ii) so that they are mostly, preferably entirely, be removed, and thus, they do not affect the membrane resistance at the time of the operation of the alkali chloride electrolysis using the ion exchange membrane 1. After the ion exchange membrane 1 is placed in the electrolytic bath, there will be no large external force exerted to the ion exchange membrane 1, and thus, even if sacrificial threads 24 are completely eluted in an aqueous alkaline solution and removed, the ion exchange membrane 1 is less likely to be susceptible to rupture such as cracking. Otherwise, all of the sacrificial threads 24 may be eluted in step (i).

(Inorganic Particle Layer)

The ion exchange membrane 1 may be further provided with an inorganic particle layer (not shown) on one or both of the outermost surfaces. The inorganic particle layer is preferably provided on at least one of the outermost surfaces of the ion exchange membrane 1, and more preferably provided on both of them.

When gas generated by alkali chloride electrolysis adheres to the surface of the ion exchange membrane 1, the electrolysis voltage becomes high at the time of alkali chloride electrolysis. The inorganic particle layer is provided to suppress the adhesion of gas generated by alkali chloride electrolysis on the surface of the ion exchange membrane 1 and thus to suppress the increase in the electrolysis voltage. The inorganic particle layer comprises inorganic particles and a binder.

The inorganic particles are preferably ones which are excellent in corrosion resistance against an alkali chloride or an aqueous alkali hydroxide solution and which have hydrophilicity. Specifically, at least one type selected from the group consisting of an oxide, nitride and carbide of Group 4 element or Group 14 element, is preferred. In particular, $SiO_2$, SiC, $ZrO_2$ or ZrC is more preferred, and $ZrO_2$ is particularly preferred.

The average particle diameter of the inorganic particles is preferably from 0.5 to 1.5 μm, more preferably from 0.7 to 1.3 μm. When the average particle diameter is at least the above lower limit value, a high gas deposition suppressing effect is obtainable. When the average particle diameter is at most the above upper limit value, excellent dropping resistance of inorganic particles is obtainable. Here, for the average particle diameter of the inorganic particles, inorganic particles are observed by a scanning electron microscope (SEM), and with respect to 30 minimum particles in the SEM observation image, the particle sizes are measured by using an image size measurement software (manufactured by Innotech Corporation, Pixs2000 PRO), whereby the average particle diameter is represented by their average value.

As the binder, preferred is one excellent in corrosion resistance against an alkali chloride or an aqueous alkali hydroxide solution, and having a hydrophilicity, and a fluorinated polymer having carboxy groups or sulfo groups is preferred, and fluorinated polymer having sulfo groups is more preferred. The fluorinated polymer may be a homopolymer of a monomer having a carboxy group or a sulfo group, or may be a copolymer of a monomer having a carboxy group or a sulfo group, and a monomer copolymerizable therewith.

The mass ratio of the binder (binder ratio) to the total mass of the inorganic particles and the binder in the inorganic particle layer is preferably from 0.15 to 0.3, more preferably from 0.15 to 0.25, further preferably from 0.16 to 0.20. When the binder ratio is at least the above lower limit value, excellent dropping resistance of inorganic particles is obtainable. When the binder ratio is at most the above upper limit value, a high gas deposition suppressing effect is obtainable.

[Method for Producing Ion Exchange Membrane for Alkali Chloride Electrolysis]

The ion exchange membrane for alkali chloride electrolysis of the present invention is produced via the above-described step (i), but step (i) preferably comprises the following step (i-a) and step (i-b).

(Step (i-a))

The reinforced precursor membrane can be produced by laminating a layer (C') made of a fluorinated polymer having groups convertible to carboxylic acid functional groups, a layer (S'a) made of a fluorinated polymer having groups convertible to sulfonic acid functional groups, a reinforcing fabric and a layer (S'b) made of a fluorinated polymer having groups convertible to sulfonic acid functional groups. That is, the reinforced precursor membrane can be produced by laminating the precursor membrane together with a reinforcing fabric. The precursor membrane may be a membrane composed of a single layer of a fluorinated polymer having groups convertible to ion exchange groups, or may be a membrane composed of a plurality of such layers.

In one embodiment of step (i-a), first, a laminate membrane having a layer (C') made of a fluorinated polymer having groups convertible to carboxylic acid functional groups and a layer (S'a) made of a fluorinated polymer having groups convertible to sulfonic acid functional groups, is obtained by coextrusion. Further, separately, by a single layer extrusion method, a membrane (hereinafter referred to also as a membrane (S'b)) made of a layer (S'b) made of a fluorinated polymer having groups convertible to sulfonic acid functional groups, is obtained.

Then, the membrane (S'b), a reinforcing fabric and the above laminated membrane are placed in this order, and they are laminated by means of laminating rolls or a vacuum lamination apparatus. At that time, the above laminate membrane is disposed so that the layer (S'a) side is in contact with the reinforcing fabric. In the reinforced precursor membrane thus obtained, the layer (S'b), the reinforcing fabric, the layer (S'a) and the layer (C') are stacked in this order.

Further, in step (i-b) as described later, the layer (C'), the layer (S'a) and the layer (S'b) will be converted to the layer (C), the layer (Sa) and the layer (Sb), respectively. Further, the thicknesses when dried of the layer (C), layer (Sa) and layer (Sb) in the ion exchange membrane and the thicknesses of the layer (C'), layer (S'a) and layer (S'b) in the reinforced precursor membrane are approximately in a relationship of the following formula (I).

The thickness of each layer in the reinforced precursor membrane ≈ the thickness of each layer when dried in the ion exchange membrane×0.9 (I).

Thus, in order to bring the thicknesses of the layer (C), layer (Sa) and layer (Sb) of the ion exchange membrane to be the desired thicknesses, the thicknesses of the corresponding layer (C'), layer (S'a) and layer (S'b) in the reinforced precursor membrane may be made to be the thicknesses obtainable by the above formula (I).

Further, in a case where the layer (Sa) is made to be two or more layers, separately a membrane composed of a layer made of a fluorinated polymer having groups convertible to sulfonic acid functional groups may be prepared and laminated between a reinforcing fabric and the above laminate membrane so that the layer (Sa) will be made to be a plurality of layers.

(Step (i-b))

In step (i-b), by letting the reinforced precursor membrane obtained in the above step (i-a) be in contact with an aqueous alkaline solution, the groups convertible to ion exchange groups in the reinforced precursor membrane will be converted to the ion exchange groups, and at the same time, at least a part of sacrificial threads in the reinforced precursor membrane will be eluted, to obtain an ion exchange membrane for alkali chloride electrolysis.

The conversion to ion exchange groups is preferably conducted by a method using a mixture of a water-soluble organic compound, a hydroxide of an alkali metal and water, as described, for example, in JP-A-H1-140987. As the above water-soluble organic compound, dimethyl sulfoxide, ethanol, etc. may be mentioned. As the above hydroxide of an alkali metal, potassium hydroxide or sodium hydroxide may be mentioned.

As shown in FIG. 1, by the conversion to ion exchange groups, the layer (C') is converted to a layer (C)12, the layer (S'a) to a layer (Sa) 14A, and the layer (S'b) to a layer (Sb) 14B, respectively. Further, in a case where the layer (Sa) 14A is composed of a plurality of layers, for example, two layers, as shown in FIG. 2, a layer (Sa-1) 14Aa and a layer (Sa-2) 14Ab constitute the layer (Sa) 14A, which, together with the layer (Sb) 14B, constitutes a layer (S) 14.

Elution of sacrificial threads is preferably carried out by hydrolyzing the material constituting the sacrificial threads.

[Alkali Chloride Electrolysis Apparatus]

Figure 3:
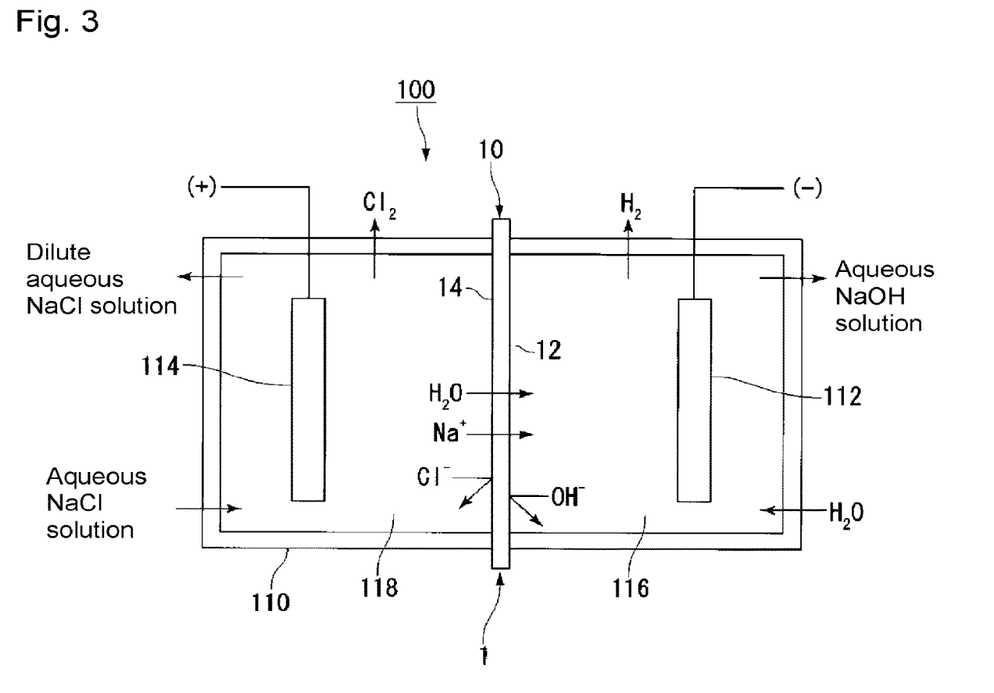
FIG. 3 is a schematic diagram showing an example of the alkali chloride electrolysis apparatus of the present invention.

The alkali chloride electrolysis apparatus of the present invention may employ a known embodiment, except that it has the ion exchange membrane for alkali chloride electrolysis of the present invention. FIG. 3 is a schematic diagram showing an example of the alkali chloride electrolysis apparatus of the present invention. In FIG. 3, the alkali chloride electrolysis apparatus 100 comprises an electrolytic bath 110 provided with a cathode 112 and an anode 114, and an ion exchange membrane 1 mounted in the electrolytic bath 110 so as to partition inside of the electrolytic bath 110 into a cathode chamber 116 on the cathode 112 side and an anode chamber 118 on the anode 114 side.

The ion exchange membrane 1 is mounted in the electrolytic bath 110 so that the layer (C) 12 be on the cathode 112 side, and the layer (S) 14 be on the anode 114 side.

The cathode 112 may be placed in contact with the ion exchange membrane 1, or may be placed to have a space from the ion exchange membrane 1. The material constituting the cathode chamber 116 is preferably a material which is resistant to an alkali hydroxide and hydrogen. Such a material may be stainless steel, nickel, etc. The material constituting the anode chamber 118 is preferably a material which is resistant to an alkali chloride and chlorine. Such a material may be titanium, etc.

As the base material of the cathode, from the viewpoint of the resistance to an alkali hydroxide and hydrogen, and the processability, preferred is stainless steel or nickel, etc. As the base material of the anode, from the viewpoint of the resistance to an alkali chloride and chlorine, and the processability, preferred is titanium, etc. The surface of the electrode base material is preferably coated with, for example, ruthenium oxide, iridium oxide, etc.

[Method for Producing Alkali Hydroxide]

The method for producing an alkali hydroxide of the present invention may employ a known embodiment, except that it is carried out by the alkali chloride electrolysis apparatus of the present invention. For example, in the case of preparing an aqueous sodium hydroxide solution by electrolyzing an aqueous sodium chloride solution, the aqueous sodium chloride solution is electrolyzed by supplying the aqueous sodium chloride solution to the anode chamber 118 of the alkali chloride electrolysis apparatus 100, and supplying the aqueous sodium hydroxide solution to the cathode chamber 116, while maintaining the concentration of the aqueous sodium hydroxide solution discharged from the cathode chamber 116 to be at a predetermined concentration (e.g. 32 mass %).

In the method for producing an alkali hydroxide of the present invention, the object of the present invention is achieved as follows. Usually, in order to increase the water permeability of an ion exchange membrane, it is conceivable to make the thickness of the layer (C) to be thin, or to increase the ion exchange capacity in order to increase the degree of swelling. However, if the thickness of the layer (C) is made thin, or the ion exchange capacity is increased, also the amount of chloride ions passing through the ion exchange membrane will be increased, whereby the alkali chloride concentration in the aqueous alkali hydroxide solution to be produced, will be increased, and the caustic alkali quality of the aqueous alkali hydroxide solution will be lowered.

In the present invention, it has been found that in the layer (S) of fluorinated polymer having sulfonic acid functional groups, the properties of the layer (Sb) located on the anode side of the reinforcing material, particularly the ion exchange capacity and thickness of the fluorinated polymer (S) constituting the layer (Sb) present a great influence to the water permeability, and by adjusting these properties to be within specific ranges, it is possible to secure a sufficient water permeability and to further lower the electrolysis voltage. On the other hand, to the amount of chloride ions passing through the ion exchange membrane, the thickness of the layer (C) presents a great influence, together with the ion exchange capacity, and therefore, by adjusting the thickness of the layer (C) to be in a specific range, it is possible to make the caustic alkali quality of the obtainable aqueous alkali hydroxide solution to be good, and at the same time, to lower the electrolysis voltage.

In light of the above findings, in the present invention, by adjusting the ion exchange capacity and thickness of the layer (Sb) to be in specific ranges, and further adjusting the thickness of the layer (C) and the ion exchange capacity and thickness of the layer (Sa) to be in specific ranges, it is possible, while securing a sufficient water permeability of the ion exchange membrane, to suppress an increase in the alkali chloride concentration in the aqueous alkali hydroxide solution to be formed, thereby to maintain the high caustic alkali quality, and to further lower the electrolysis voltage.

EXAMPLES

In the following, the present invention will be described in detail with reference to Examples, but the present invention is by no means limited by these Examples.

[Measurement of TQ Value]

The TQ value was obtained as a temperature showing a volume flow rate: 100 mm$^3$/sec. The volume flow rate was regarded as the amount of a polymer flowing out (mm$^3$/sec.) at the time when the target polymer was melted and flowed out from an orifice (diameter: 1 mm, length: 1 mm) at a constant temperature under a pressure of 3 MPa by using Shimadzu Flow Tester CFD-100D (manufactured by Shimadzu Corporation).

[Calculation of Ion Exchange Capacity]

About 0.5 mg of a fluorinated polymer having groups convertible to ion exchange groups was flat-pressed at a temperature higher by about 10° C. than its TQ value, to obtain a film. The obtained film was analyzed by a transmission infrared spectrometer. Using the respective peak heights of $CF_2$ peak, $CH_3$ peak, OH peak, CF peak, $SO_2F$ peak of the obtained spectrum, the proportion of structural units having groups convertible to carboxylic acid functional groups or groups convertible to sulfonic acid functional groups was calculated. Using this proportion as the proportion of structural units having a carboxylic acid functional group or a sulfonic acid functional group in the fluorinated polymer obtained after hydrolysis treatment, the ion exchange capacity was obtained by using samples with known ion exchange capacities as a calibration curve.

In the above measurement, it is possible to measure ion-exchange groups of either acid form or potassium form or sodium form.

[Thickness of Layer]

The thickness of each layer when dried in the ion exchange membrane was obtained by means of an image software (manufactured by Innotech Corporation Pixs2000 PRO), by observing the cross section of the ion exchange membrane by an optical microscope after the ion exchange membrane was dried at 90° C. for 4 hours. Here, the thickness of each layer is the thickness at a position where reinforcing threads and sacrificial threads constituting the reinforcing material are not present.

[Measurement of Electrolytic Performance]

The ion exchange membrane was, so that the layer (C) faced the cathode, placed in a test electrolytic bath having an electrolytic surface being a rectangular of vertical 150 mm×horizontal 100 mm, and electrolysis of an aqueous sodium chloride solution was conducted under conditions of sodium hydroxide concentration in the cathode chamber : 32 mass %, sodium chloride concentration in the anode chamber: 200 g/L, temperature: 90° C., and current density: 6 kA/m$^2$, whereby the electrolysis voltage (V), current efficiency (%) and sodium chloride concentration in the aqueous alkali hydroxide solution, after 3 to 10 days from the initiation of operation, were obtained. From the amount of water added to the catholyte and the current efficiency at that time, the water permeability was calculated as the molar ratio (mol/mol) of water moved per mol of sodium ions.

[Measurement of Caustic Alkali Quality]

For the caustic alkali quality, the mass of the alkali chloride to the alkali hydroxide in the aqueous alkali hydroxide solution obtained by electrolysis, was determined by titration using an aqueous silver nitrate solution by using an aqueous potassium chromate solution as an indicator, and represented by parts per million (unit: ppm) by the following formula.

(Mass of alkali chloride in aqueous alkali hydroxide solution/mass of alkali hydroxide in aqueous alkali hydroxide solution)×1,000,000

[Ex. 1]

As a fluorinated polymer to form a layer (C'), a fluorinated polymer having groups convertible to carboxylic acid functional groups (ion exchange capacity after hydrolysis: 1.08 meq/g, hereinafter referred to as polymer C) was synthesized by copolymerizing TFE and a fluorinated monomer represented by the following formula (X).

$$CF_2\!\!=\!\!CF\!-\!O\!-\!CF_2CF_2CF_2\!-\!COOCH_3 \tag{X}$$

As a fluorinated polymer to form a layer (S'a), a fluorinated polymer having groups convertible to sulfonic acid functional groups (ion exchange capacity after hydrolysis: 1.1 meq/g, hereinafter referred to as polymer S1) was synthesized by copolymerizing TFE and a fluorinated monomer represented by the following formula (Y).

$$CF_2\!\!=\!\!CF\!-\!O\!-\!CF_2CF(CF_3)\!-\!O\!-\!CF_2CF_2\!-\!SO_2F \tag{Y}$$

As a fluorinated polymer to form a layer (S'b), a fluorinated polymer having groups convertible to sulfonic acid functional groups (ion exchange capacity after hydrolysis: 1.25 meq/g, hereinafter referred to as polymer S2) was synthesized by copolymerizing TFE and a fluorinated monomer represented by the formula (Y).

The polymer C and the polymer S1 were molded by a melt co-extrusion method to obtain a film A of two-layer structure comprising a layer (C'1) (thickness: 12 μm) of the polymer C and a layer (S'1) (thickness: 68 μm) of the polymer S1.

The polymer S2 was molded by a melt extrusion method to obtain a film B for a layer (S'2) (thickness: 30 μm) of the polymer S2.

A PTFE film was rapidly stretched and then slit in a width of 100 denier to obtain a monofilament, which was twisted 2,000 times/m to obtain a PTFE thread which was used as a reinforcing thread. Six PET filaments of 5 denier were aligned to obtain a PET thread made of a multi-filament of 30 denier, which was used as a sacrificial thread. Plain weave was conducted so that one reinforcing thread and two sacrificial threads were alternately arranged, to obtain a reinforcing fabric (the density of reinforcing threads: 27 threads/inch, the density of sacrificial threads: 108 threads/inch).

By using the film A, the film B and the reinforcing fabric obtained as described above, an ion exchange membrane 1 corresponding to the embodiment of FIG. 1 was prepared as follows.

The film B, the reinforcing fabric, the film A and a releasing PET film (thickness: 100 μm) were overlaid in this order so that the layer (C'1) of the film A was on the releasing PET film side, and laminated by using rolls. The releasing PET film was peeled off, to obtain a reinforced precursor membrane. The thickness of each layer in reinforced precursor membrane was such that the layer (C') was 12 μm, the layer (S'a) was 68 μm, and the layer (S'b) was 30 μm.

A paste comprising 29.0 mass % of zirconium oxide (average particle size (D50: 1 μm), 1.3 mass % of methylcellulose, 4.6 mass % of cyclohexanol, 1.5 mass % of cyclohexane and 63.6 mass % of water, was transferred by a roll press on the upper side of the layer (S'2) of the reinforced precursor membrane, to form an inorganic particle layer. The adhesion amount of zirconium oxide was adjusted to be 20 g/m².

The reinforced precursor membrane having the inorganic particle layer formed on one side was immersed at 95° C. for 8 minutes in an aqueous solution containing 5 mass % of dimethyl sulfoxide and 30 mass % of potassium hydroxide. Thus, —COOCH$_3$ of the polymer C and —SO$_2$F of the polymers S1 and the polymer S2 were hydrolyzed and converted to ion exchange groups, to obtain a membrane wherein the precursor layer (C'1) was converted to the layer (C1), the layer (S'1) to the layer (S1), and the layer (S'2) to the layer (S2). Here, in FIG. 1, the layer (C) 12 corresponds to the layer (C1), the layer (Sa) 14A to the layer (S1), and the layer (Sb) 14B to the layer (S2).

A dispersion having zirconium oxide (average particle diameter: 1 μm) dispersed at a concentration of 13 mass % in an ethanol solution containing 2.5 mass % an acid-form polymer of polymer S1, was prepared. The dispersion was sprayed on the layer (C1) side of the membrane to form an inorganic particle layer. The adhered amount of zirconium oxide was 3 g/m².

[Ex. 2]

An ion exchange membrane was obtained in the same manner as in Ex. 1 except that as the fluorinated polymer to form the layer (S'b), in place of the polymer S2, a fluorinated polymer (ion exchange capacity: 1.4 meq/g) having groups convertible to sulfonic acid functional groups, obtained by copolymerizing TFE and a fluorinated monomer represented by the formula (Y), was used. Here, the thickness of each layer in the reinforced precursor membrane was such that the layer (C') was 12 μm, the layer (S'a) was 68 μm, and the layer (S'b) was 30 μm.

[Ex. 3]

An ion exchange membrane was obtained in the same manner as in Ex. 1 except that as the fluorinated polymer to form the layer (S'b), in place of the polymer S2, a fluorinated polymer (ion exchange capacity: 1.9 meq/g) having groups convertible to sulfonic acid functional groups, obtained by copolymerizing TFE and a fluorinated monomer represented by the formula (Z), was used. Here, the thickness of each layer in the reinforced precursor membrane was such that the layer (C') was 12 μm, the layer (S'a) was 68 μm, and the layer (S'b) was 30 μm.

[Ex. 4]

An ion exchange membrane was obtained in the same manner as in Ex. 1 except that as the fluorinated polymer to form the layer (S'a), in place of the polymer S1, a fluorinated polymer (ion exchange capacity: 1.25 meq/g) having groups convertible to sulfonic acid functional groups, obtained by copolymerizing TFE and a fluorinated monomer represented by the formula (Y), was used, and as the fluorinated polymer to form the layer (S'b), in place of the polymer S2, a fluorinated polymer (ion exchange capacity: 2.2 meq/g) having groups convertible to sulfonic acid functional groups, obtained by copolymerizing TFE and a fluorinated monomer represented by the formula (Z), was used. Here, the thickness of each layer in the reinforced precursor membrane was such that the layer (C') was 12 μm, the layer (S'a) was 68 μm, and the layer (S'b) was 30 μm.

[Ex. 5]

An ion exchange membrane was obtained in the same manner as in Ex. 1 except that as the fluorinated polymer to form the layer (S'a), in place of the polymer S1, a fluorinated polymer (ion exchange capacity: 1.0 meq/g) having groups convertible to sulfonic acid functional groups, obtained by copolymerizing TFE and a fluorinated monomer represented by the formula (Y), was used, as the fluorinated polymer to form the layer (S'b), in place of the polymer S2, a fluorinated polymer (ion exchange capacity: 1.9 meq/g) having groups convertible to sulfonic acid functional groups, obtained by copolymerizing TFE and a fluorinated monomer represented by the formula (Z), was used, and the thickness of each layer in the reinforced precursor membrane was adjusted to be as shown in Table 1 so that the layer (C') was 20 μm, the layer (S'a) was 80 μm, and the layer (S'b) was 35 μm.

[Ex. 6]

An ion exchange membrane was obtained in the same manner as in Ex. 1 except that as the fluorinated polymer to form the layer (S'b), in place of the polymer S2, a fluorinated polymer (ion exchange capacity: 1.9 meq/g) having groups convertible to sulfonic acid functional groups, obtained by copolymerizing TFE and a fluorinated monomer represented by the formula (Z), was used, and the thickness of each layer in the reinforced precursor membrane was adjusted to be as shown in Table 1 so that the layer (C') was 12 μm, the layer (S'a) was 80 μm, and the layer (S'b) was 30 μm.

[Ex. 7]

An ion exchange membrane was obtained in the same manner as in Ex. 1 except that as the fluorinated polymer to form the layer (S'b), in place of the polymer S2, a fluorinated polymer (ion exchange capacity: 1.9 meq/g) having groups convertible to sulfonic acid functional groups, obtained by copolymerizing TFE and a fluorinated monomer represented by the formula (Z), was used, and the thickness of each layer in the reinforced precursor membrane was adjusted to be as shown in Table 1 so that the layer (C') was 12 μm, the layer (S'a) was 68 μm, and the layer (S'b) was 20 μm.

[Ex. 8]

An ion exchange membrane was obtained in the same manner as in Ex. 1 except that as the fluorinated polymer to form the layer (S'b), in place of the polymer S2, a fluorinated polymer (ion exchange capacity: 1.9 meq/g) having groups convertible to sulfonic acid functional groups, obtained by copolymerizing TFE and a fluorinated monomer represented by the formula (Z), was used, and the thickness of each layer in the reinforced precursor membrane was adjusted to be as shown in Table 1 so that the layer (C') was 12 μm, the layer (S'a) was 68 μm, and the layer (S'b) was 40 μm.

[Ex. 9]

An ion exchange membrane was obtained in the same manner as in Ex. 1 except that as the fluorinated polymer to form the layer (S'b), in place of the polymer S2, a fluorinated polymer (ion exchange capacity: 1.9 meq/g) having groups convertible to sulfonic acid functional groups, obtained by copolymerizing TFE and a fluorinated monomer represented by the formula (Z), was used, and the thickness of each layer in the reinforced precursor membrane was adjusted to be as shown in Table 1 so that the layer (C') was 12 μm, the layer (S'a) was 68 μm, and the layer (S'b) was 65 μm.

[Ex.10]

An ion exchange membrane was obtained in the same manner as in Ex. 1 except that as the fluorinated polymer to form the layer (S'b), in place of the polymer S2, a fluorinated polymer (ion exchange capacity: 1.1 meq/g) having groups convertible to sulfonic acid functional groups, obtained by copolymerizing TFE and a fluorinated monomer represented by the formula (Y), was used. Here, the thickness of each layer in the reinforced precursor membrane was such that the layer (C') was 12 μm, the layer (S'a) was 68 μm, and the layer (S'b) was 30 μm.

[Ex. 11]

An ion exchange membrane was obtained in the same manner as in Ex. 10 except that the thickness of each layer in the reinforced precursor membrane was adjusted to be as shown in Table 1 so that the layer (C') was 7 μm, the layer (S'a) was 68 μm, and the layer (S'b) was 30 μm.

[Ex. 12]

An ion exchange membrane was obtained in the same manner as in Ex. 11 except that as the fluorinated polymer to form the layer (C'), in place of the polymer C, a fluorinated polymer (ion exchange capacity: 0.95 meq/g) having groups convertible to carboxylic acid functional groups, obtained by copolymerizing TFE and a fluorinated monomer represented by the formula (X), was used, and the reinforced precursor membrane was hydrolyzed by using an aqueous solution of 30 mass % of dimethyl sulfoxide and 15 mass % of potassium hydroxide. Here, the thickness of each layer in the reinforced precursor membrane was such that the layer (C') was 7 μm, the layer (S'a) was 68 μm, and the layer (S'b) was 30 μm.

[Ex. 13]

An ion exchange membrane was obtained in the same manner as in Ex. 2 except that the thickness of each layer in the reinforced precursor membrane was adjusted to be as shown in Table 1 so that the layer (C') was 35 μm, the layer (S'a) was 68 μm, and the layer (S'b) was 30 μm.

[Ex. 14]

An ion exchange membrane was obtained in the same manner as in Ex. 3 except that the thickness of each layer in the reinforced precursor membrane was adjusted to be as shown in Table 1 so that the layer (C') was 12 μm, the layer (S'a) was 150 μm, and the layer (S'b) was 30 μm.

[Ex. 15]

In order to use a fluorinated polymer having an ion exchange capacity of 3.0 meq/g as a fluorinated polymer to form the layer (S'b) instead of the polymer S2, an attempt was made to copolymerize TFE and a fluorinated monomer represented by the formula (Z), but a trouble occurred in the polymerization, and it could not be molded as a film.

The current efficiency, the electrolysis voltage, the caustic alkali quality and the water permeability of the ion exchange membrane in each Ex. except Ex. 15, are shown in Table 1.

TABLE 1

| | Layer (C') or layer (C) | | | Layer (S'a) or layer (Sa) | | | Layer (S'b) or layer (Sb) | | |
|---|---|---|---|---|---|---|---|---|---|
| | Ion exchange capacity [meq/g dry resin] | Thickness [μm] of precursor layer (C') | Thickness [μm] of layer (C) when dried | Ion exchange capacity [meq/g dry resin] | Thickness [μm] of precursor layer (S'a) | Thickness [μm] of layer (Sa) when dried | Ion exchange capacity [meq/g dry resin] | Thickness [μm] of precursor layer (S'b) | Thickness [μm] of layer (Sb) when dried |
| Ex. 1 | 1.08 | 12 | 13 | 1.1 | 68 | 72 | 1.25 | 30 | 33 |
| Ex. 2 | 1.08 | 12 | 13 | 1.1 | 68 | 77 | 1.4 | 30 | 34 |
| Ex. 3 | 1.08 | 12 | 13 | 1.1 | 68 | 73 | 1.9 | 30 | 32 |
| Ex. 4 | 1.08 | 12 | 14 | 1.25 | 68 | 77 | 2.2 | 30 | 33 |
| Ex. 5 | 1.08 | 20 | 22 | 1.0 | 80 | 90 | 1.9 | 35 | 37 |
| Ex. 6 | 1.08 | 12 | 14 | 1.1 | 80 | 88 | 1.9 | 30 | 34 |
| Ex. 7 | 1.08 | 12 | 14 | 1.1 | 68 | 78 | 1.9 | 20 | 22 |
| Ex. 8 | 1.08 | 12 | 13 | 1.1 | 68 | 79 | 1.9 | 40 | 46 |
| Ex. 9 | 1.08 | 12 | 13 | 1.1 | 68 | 73 | 1.9 | 65 | 74 |
| Ex. 10 | 1.08 | 12 | 14 | 1.1 | 68 | 76 | 1.1 | 30 | 34 |
| Ex. 11 | 1.08 | 7 | 8 | 1.1 | 68 | 73 | 1.1 | 30 | 34 |
| Ex. 12 | 0.95 | 7 | 8 | 1.1 | 68 | 78 | 1.1 | 30 | 33 |
| Ex. 13 | 1.08 | 35 | 39 | 1.1 | 68 | 78 | 1.4 | 30 | 31 |
| Ex. 14 | 1.08 | 12 | 14 | 1.1 | 150 | 168 | 1.9 | 30 | 33 |

TABLE 1-continued

|  | Current efficiency [%] | Electrolysis voltage [V] | Caustic alkali quality [ppm] | Water permeability [mol/F] |
|---|---|---|---|---|
| Ex. 1 | 96.5 | 3.08 | 23 | 4.0 |
| Ex. 2 | 96.5 | 3.07 | 20 | 4.3 |
| Ex. 3 | 96.5 | 3.01 | 18 | 4.6 |
| Ex. 4 | 96.5 | 2.99 | 25 | 4.8 |
| Ex. 5 | 96.5 | 3.09 | 11 | 4.6 |
| Ex. 6 | 96.5 | 3.02 | 17 | 4.6 |
| Ex. 7 | 96.5 | 3.01 | 19 | 4.6 |
| Ex. 8 | 96.5 | 3.01 | 17 | 4.6 |
| Ex. 9 | 96.5 | 3.05 | 16 | 4.7 |
| Ex. 10 | 96.5 | 3.10 | 21 | 4.0 |
| Ex. 11 | 96.5 | 3.07 | 35 | 4.7 |
| Ex. 12 | 96.5 | 3.10 | 40 | 4.9 |
| Ex. 13 | 96.5 | 3.15 | 9 | 4.6 |
| Ex. 14 | 96.5 | 3.14 | 11 | 4.6 |

In Ex. 2 to 9 wherein an ion exchange membrane of the present invention was used, the water permeability was high, the caustic alkali quality of the produced aqueous sodium hydroxide solution was good, and further, the electrolysis voltage was low.

On the other hand, in Ex 1 and Ex. 10, since the layer (C) had a sufficient thickness, it was possible to produce an aqueous sodium hydroxide solution with a good caustic alkali quality, but the ion exchange capacity of the layer (Sb) was low and did not satisfy the conditions of the present invention, whereby the water permeability was low. In Ex. 11 and Ex. 12, by reducing the thickness of the layer (C), it was possible to realize a high water permeability, but the caustic alkali quality was inferior. In Ex. 13 and Ex. 14, since the ion exchange capacity of the layer (Sb) satisfied the conditions of the present invention, it was possible to achieve a high water permeability, but since the thickness of the layer (C) was thick (Ex. 13), or since the thickness of the layer (Sa) was thick (Ex. 14), the electrolysis voltage was high. In Ex. 15, an attempt was made to produce a film made of a polymer having an ion exchange capacity of the layer (Sb) higher than the conditions of the present invention, but it was not possible to obtain a copolymer which could be formed into a film.

From the above results, it has been made clear that by the improvement of the water permeability by reducing the thickness of the layer (C), it is not possible to produce an alkali hydroxide having a sufficient caustic alkali quality. On the other hand, it has been made clear that even without changing the thickness of the layer (C), when the ion exchange capacity and the thickness of the polymer constituting the layer (Sb) satisfy the conditions of the present invention, it is possible, without difficulty for the production of a film, to produce an alkali hydroxide having a sufficient caustic alkali quality in order to improve the water permeability. Further, it has been made clear that when the thicknesses of the layer (C) and the layer (Sa) satisfy the conditions of the present invention, it is possible to prevent an increase of the electrolysis voltage.

This application is a continuation of PCT Application No. PCT/JP2017/015157, filed on Apr. 13, 2017, which is based upon and claims the benefit of priority from Japanese Patent Application No. 2016-080157 filed on Apr. 13, 2016. The contents of those applications are incorporated herein by reference in their entireties.

REFERENCE SYMBOLS

1: ion exchange membrane for alkali chloride electrolysis, 10: electrolyte membrane, 12: layer (C), 14: layer (S), 14A: the layer (Sa), 14Aa: layer (Sa-1), 14Ab: layer (Sa-2), 14B: layer (Sb), 20: reinforcing material, 22: reinforcing thread, 24: sacrificial thread, 26: filament, 28: elution hole, 100: alkali chloride electrolysis apparatus, 110: electrolytic bath, 112: cathode, 114: anode, 116: cathode chamber, 118: anode chamber

What is claimed is:

1. An ion exchange membrane for alkali chloride electrolysis comprising a layer (C) made of a fluorinated polymer having carboxylic acid functional groups at the surface on a cathode side, and a layer (S) made of a fluorinated polymer having sulfonic acid functional groups at the surface on an anode side, characterized in that a reinforcing material comprising reinforcing threads is disposed in the layer (S) made of a fluorinated polymer having sulfonic acid functional groups, the thickness when dried, of the layer (C) made of a fluorinated polymer having carboxylic acid functional groups is from 9 to 28 µm, in the layer (S) made of a fluorinated polymer having sulfonic acid functional groups, a layer (Sb) located on the anode side of the reinforcing material includes a layer made of a fluorinated polymer having sulfonic acid functional groups with an ion exchange capacity of from 1.3 to 2.5 meq/g dry resin, and has a thickness when dried, of from 6 to 100 µm, and a layer (Sa) located on the cathode side of the reinforcing material includes a layer made of a fluorinated polymer having sulfonic acid functional groups with an ion exchange capacity of from 0.9 to 1.25 meq/g dry resin, and has a thickness when dried, of from 40 to 110 µm.

2. The ion exchange membrane for alkali chloride electrolysis according to claim 1, wherein at least a part of the fluorinated polymer having sulfonic acid functional groups constituting the layer (Sb) made of a fluorinated polymer having sulfonic acid functional groups located on the anode side of the reinforcing material is a polymer having structural units represented by the following formula (U1):

wherein $Q^1$ is a perfluoroalkylene group which may have an etheric oxygen atom, $Q^2$ is a single bond or a perfluoroalkylene group which may have an etheric oxygen atom, $R^{f1}$ is a perfluoroalkyl group which may have an etheric oxygen atom, $X^1$ is an oxygen atom, a nitrogen atom or a carbon atom, when $X^1$ is an oxygen atom, a is 0, when $X^1$ is a nitrogen atom, a is 1, when $X^1$ is a carbon atom, a is 2, $Y^1$ is a fluorine atom or a monovalent perfluoro organic group, r is 0 or 1, and M is a hydrogen atom, an alkali metal or a quaternary ammonium base.

3. The ion exchange membrane for alkali chloride electrolysis according to claim 2, wherein the structural units represented by the formula (U1) are structural units based on a monomer represented by the formula (M1):

wherein $R^{F11}$ is a single bond or a $C_{1-6}$ linear perfluoroalkylene group which may have an etheric oxygen atom, and $R^{F12}$ is a $C_{1-6}$ linear perfluoroalkylene group.

4. The ion exchange membrane for alkali chloride electrolysis according to claim 1, wherein the ion exchange capacity of at least a part of the fluorinated polymer having carboxylic acid functional groups constituting the layer (C) made of a fluorinated polymer having carboxylic acid functional groups is from 0.5 to 2.0 meq/g dry resin.

5. The ion exchange membrane for alkali chloride electrolysis according to claim 1, wherein the layer (Sa) located on the cathode side of the reinforcing material is a layer composed of two or more layers.

6. The ion exchange membrane for alkali chloride electrolysis according to claim 5, wherein among the layers forming the layer (Sa) located on the cathode side of the reinforcing material, a layer (Sa-1) located on the most cathode side is a layer made of a fluorinated polymer having sulfonic acid functional groups with a thickness when dried, of from 1 to 55 μm and an ion exchange capacity of from 0.9 to 1.25 meq/g dry resin.

7. The ion exchange membrane for alkali chloride electrolysis according to claim 1, wherein the reinforcing material comprises reinforcing threads and sacrificial threads.

8. The ion exchange membrane for alkali chloride electrolysis according to claim 1, which further has an inorganic particle layer at the outermost surface of at least one side.

9. A method for producing an ion exchange membrane for alkali chloride electrolysis as defined in claim 1, characterized by laminating a layer (C') made of a fluorinated polymer having groups convertible to carboxylic acid functional groups, a layer (S'a) made of a fluorinated polymer having groups convertible to sulfonic acid functional groups, a reinforcing fabric and a layer (S'b) made of a fluorinated polymer having groups convertible to sulfonic acid functional groups, in this order to obtain a reinforced precursor membrane, and then, contacting the reinforced precursor membrane with an aqueous alkaline solution, to convert the groups convertible to ion exchange groups in the reinforced precursor membrane to ion exchange groups.

10. The method for producing an ion exchange membrane for alkali chloride electrolysis according to claim 9, wherein the reinforcing fabric is made of reinforcing threads and sacrificial threads, and the reinforcing precursor membrane is brought in contact with an aqueous alkaline solution to convert the groups convertible to ion exchange groups to ion exchange groups, and to dissolve at least a part of the reinforcing threads in the reinforcing fabric to form a reinforcing material.

11. The method for producing an ion exchange membrane for alkali chloride electrolysis according to claim 9, wherein the aqueous alkaline solution is a mixture of a water-soluble organic compound, a hydroxide of an alkali metal and water.

12. An alkali chloride electrolysis apparatus characterized by comprising an electrolytic bath provided with a cathode and an anode, and an ion-exchange membrane for alkali chloride electrolysis as defined in claim 1 that partitions a cathode chamber on the cathode side and an anode chamber on the anode side in said electrolytic bath.

13. A method for producing an alkali hydroxide, characterized by electrolyzing an alkali chloride by using the alkali chloride electrolysis apparatus as defined in claim 12.

14. The method for producing an alkali hydroxide according to claim 13, wherein the alkali chloride is electrolyzed while supplying oxygen to the cathode chamber.

15. The method for producing an alkali hydroxide according to claim 13, wherein the content of the alkali chloride to the alkali hydroxide in the aqueous alkali hydroxide solution to be produced, is at most 25 ppm.

* * * * *